(12) United States Patent
Arifuku

(10) Patent No.: US 11,875,077 B2
(45) Date of Patent: Jan. 16, 2024

(54) HISTORY INFORMATION MANAGEMENT DEVICE, IMAGE PROCESSING DEVICE, AND HISTORY INFORMATION MANAGEMENT METHOD

(71) Applicant: SHARP KABUSHIKI KAISHA, Sakai (JP)

(72) Inventor: Naoya Arifuku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/889,001

(22) Filed: Aug. 16, 2022

(65) Prior Publication Data
US 2023/0067414 A1 Mar. 2, 2023

(30) Foreign Application Priority Data
Aug. 27, 2021 (JP) .................................. 2021-139324

(51) Int. Cl.
G06F 3/12 (2006.01)

(52) U.S. Cl.
CPC .......... *G06F 3/1273* (2013.01); *G06F 3/1203* (2013.01); *G06F 3/1257* (2013.01)

(58) Field of Classification Search
CPC ...... G06F 3/1203; G06F 3/122; G06F 3/1257; G06F 3/1273; G06F 3/1285
See application file for complete search history.

(56) References Cited

U.S. PATENT DOCUMENTS

| | | | | |
|---|---|---|---|---|
| 6,643,370 | B1* | 11/2003 | Kurihara | H04M 1/2746 379/355.09 |
| 10,545,709 | B2 | 1/2020 | Inoue | |
| 2009/0271574 | A1* | 10/2009 | Larkby-Lahet | G06F 12/122 711/E12.069 |
| 2011/0030068 | A1* | 2/2011 | Imai | H04N 1/444 726/27 |
| 2018/0217797 | A1* | 8/2018 | Inoue | H04N 1/32122 |
| 2018/0220015 | A1* | 8/2018 | Akuzawa | H04N 1/00482 |
| 2020/0159479 | A1* | 5/2020 | Yoshida | G06F 3/1273 |

FOREIGN PATENT DOCUMENTS

JP 2018-125687 A 8/2018

\* cited by examiner

*Primary Examiner* — John R Wallace
(74) *Attorney, Agent, or Firm* — ScienBiziP, P.C.

(57) ABSTRACT

A history information management device includes a storage capable of storing a predetermined limit number of pieces of setting history information pertaining to execution of a job; and a controller that controls execution of the job by using the setting history information. In a case where the number of pieces of the stored setting history information has reached the predetermined limit number, the controller deletes, from the storage, the setting history information according to a result of use of the setting history information.

13 Claims, 18 Drawing Sheets

FIG. 3

| SETTING HISTORY INFORMATION | | | | |
|---|---|---|---|---|
| JOB ID | EXECUTION DATE AND TIME | JOB TYPE | DISPLAY SETTING VALUE | SETTING VALUE FILE NAME |
| 0099 | 2020/02/22 20:20 | COPY | TRAY: TRAY 1, DOCUMENT: SINGLE-SIDED→DOUBLE-SIDED, DENSITY:TEXT, ····· | 0099.config |
| 0098 | 2020/02/22 19:19 | Scan to E-mail | TRANSMISSION DESTINATION: sample@local, test@test.ne.jp, FORMAT: HIGHLY COMPRESSED PDF, RESOLUTION: 600x600dpi, FUNCTION: BLANK PAPER, ····· | 0098.config |
| 0097 | 2020/02/22 18:18 | FAX | TRANSMISSION DESTINATION: 0123456789, SAMPLE (CO., LTD.), TRANSMISSION SIZE: A3, DOCUMENT: DOUBLE-SIDED→SINGLE-SIDED, FUNCTION: TIME-SPECIFIED, ····· | 0097.config |
| 0096 | 2020/02/22 18:10 | Scan to SMB | TRANSMISSION DESTINATION: ¥¥USERFOLDER¥test, FORMAT: jpeg, FUNCTION: MIXED DOCUMENTS, ····· | 0096.config |
| 0095 | 2020/02/12 09:01 | Scan to E-mail | TRANSMISSION DESTINATION: sample@local, FORMAT: ENCRYPTED PDF, FUNCTION: MIXED DOCUMENTS, BLANK PAPER SKIP, ····· | 0095.config |
| 0094 | 2020/02/11 20:30 | COPY | TRAY: TRAY 1, DOCUMENT: SINGLE-SIDED→DOUBLE-SIDED, ····· | 0094.config |
| 0093 | 2020/02/11 20:24 | FAX | TRANSMISSION DESTINATION: 0123456789, SAMPLE (CO., LTD.), TRANSMISSION SIZE: A3, DOCUMENT: DOUBLE-SIDED→SINGLE-SIDED, FUNCTION: TIME-SPECIFIED, ····· | 0093.config |
| 0092 | 2020/02/11 20:20 | COPY | TRAY: TRAY 3, DOCUMENT: DOUBLE-SIDED→DOUBLE-SIDED, DENSITY: TEXT+PHOTOGRAPHIC PAPER PHOTO, ····· | 0092.config |
| 0091 | 2020/02/11 17:10 | Scan to SMB | TRANSMISSION DESTINATION: ¥¥USERFOLDER¥test, FORMAT: bmp, ····· | 0091.config |
| 0090 | 2020/02/11 13:20 | FAX | TRANSMISSION DESTINATION: 0987654321, TRANSMISSION SIZE: A4, DOCUMENT: SINGLE-SIDED→SINGLE-SIDED, ····· | 0090.config |

FIG. 4

| JOB HISTORY INFORMATION | | | | |
|---|---|---|---|---|
| JOB ID | EXECUTION DATE AND TIME | JOB TYPE | USER NAME | STATUS |
| 0099 | 2020/02/22 20:20 | COPY | aaaaa | FINISHED |
| 0098 | 2020/02/22 19:19 | Scan to E-mail | aaaaa | FINISHED |
| 0097 | 2020/02/22 18:18 | FAX | aaaaa | FINISHED |
| 0096 | 2020/02/22 18:10 | Scan to SMB | aaaaa | FINISHED |
| 0095 | 2020/02/12 09:01 | Scan to E-mail | aaaaa | FINISHED |
| 0094 | 2020/02/11 20:30 | COPY | bbbbb | FINISHED |
| 0093 | 2020/02/11 20:24 | FAX | bbbbb | FINISHED |
| 0092 | 2020/02/11 20:20 | COPY | ccccc | FINISHED |
| 0091 | 2020/02/11 17:10 | Scan to SMB | aaaaa | FINISHED |
| 0090 | 2020/02/11 13:20 | FAX | | FINISHED |

FIG. 7

| JOB ID | FREQUENCY OF USE | DELETE DETERMINATION FLAG |
|---|---|---|
| 0099 | 00 | No |
| 0098 | 12 | No |
| 0097 | 00 | No |
| 0096 | 03 | No |
| 0095 | 02 | No |
| 0094 | 00 | Yes |
| 0093 | 01 | No |
| 0092 | 02 | No |
| 0091 | 04 | No |
| 0090 | 01 | No |

FIG. 8A

| SETTING HISTORY | | | | |
|---|---|---|---|---|
| JOB ID | EXECUTION DATE AND TIME | JOB TYPE | DISPLAY SETTING VALUE | SETTING VALUE FILE |
| | | | | |
| 0099 | 2020/02/22 20:20 | COPY | TRAY: TRAY 1, DOCUMENT: SINGLE-SIDED→DOUBLE-SIDED, DENSITY:TEXT, ····· | 0099.config |
| 0098 | 2020/02/22 19:19 | Scan to E-mail | TRANSMISSION DESTINATION: sample@local, test@test.ne.jp, FORMAT: HIGHLY COMPRESSED PDF, RESOLUTION: 600x600dpi, FUNCTION: BLANK PAPER, ····· | 0098.config |
| 0097 | 2020/02/22 18:18 | FAX | TRANSMISSION DESTINATION: 0123456789, SAMPLE (CO., LTD.), TRANSMISSION SIZE: A3, DOCUMENT: DOUBLE-SIDED→SINGLE-SIDED, FUNCTION: TIME-SPECIFIED, ····· | 0097.config |
| 0096 | 2020/02/22 18:10 | Scan to SMB | TRANSMISSION DESTINATION: ¥¥USERFOLDER¥test, FORMAT: jpeg, FUNCTION: MIXED DOCUMENTS, ····· | 0096.config |
| 0095 | 2020/02/12 09:01 | Scan to E-mail | TRANSMISSION DESTINATION: sample@local, FORMAT: ENCRYPTED PDF, FUNCTION: MIXED DOCUMENTS, BLANK PAPER SKIP, ····· | 0095.config |
| 0093 | 2020/02/11 20:24 | FAX | TRANSMISSION DESTINATION: 0123456789, SAMPLE (CO., LTD.), TRANSMISSION SIZE: A3, DOCUMENT: DOUBLE-SIDED→SINGLE-SIDED, FUNCTION: TIME-SPECIFIED, ····· | 0093.config |
| 0092 | 2020/02/11 20:20 | COPY | TRAY: TRAY 3, DOCUMENT: DOUBLE-SIDED→DOUBLE-SIDED, DENSITY: TEXT+PHOTOGRAPHIC PAPER PHOTO, ····· | 0092.config |
| 0091 | 2020/02/11 17:10 | Scan to SMB | TRANSMISSION DESTINATION: ¥¥USERFOLDER¥test, FORMAT: bmp, ····· | 0091.config |
| 0090 | 2020/02/11 13:20 | FAX | TRANSMISSION DESTINATION: 0987654321, TRANSMISSION SIZE: A4, DOCUMENT: SINGLE-SIDED→SINGLE-SIDED, ····· | 0090.config |

FIG. 8B

| SETTING HISTORY | | | | |
|---|---|---|---|---|
| JOB ID | EXECUTION DATE AND TIME | JOB TYPE | DISPLAY SETTING VALUE | SETTING VALUE FILE |
| 0100 | 2020/02/22 20:35 | COPY | TRAY: TRAY 1, DOCUMENT: SINGLE-SIDED→DOUBLE-SIDED, DENSITY: PHOTOGRAPHIC PAPER PHOTO, ····· | 0100.config |
| 0099 | 2020/02/22 20:20 | COPY | TRAY: TRAY 1, DOCUMENT: SINGLE-SIDED→DOUBLE-SIDED, DENSITY:TEXT, ····· | 0099.config |
| 0098 | 2020/02/22 19:19 | Scan to E-mail | TRANSMISSION DESTINATION: sample@local, test@test.ne.jp, FORMAT: HIGHLY COMPRESSED PDF, RESOLUTION: 600x600dpi, FUNCTION: BLANK PAPER, ····· | 0098.config |
| 0097 | 2020/02/22 18:18 | FAX | TRANSMISSION DESTINATION: 0123456789, SAMPLE (CO., LTD.), TRANSMISSION SIZE: A3, DOCUMENT: DOUBLE-SIDED→SINGLE-SIDED, FUNCTION: TIME-SPECIFIED, ····· | 0097.config |
| 0096 | 2020/02/22 18:10 | Scan to SMB | TRANSMISSION DESTINATION: ¥¥USERFOLDER¥test, FORMAT: jpeg, FUNCTION: MIXED DOCUMENTS, ····· | 0096.config |
| 0095 | 2020/02/12 09:01 | Scan to E-mail | TRANSMISSION DESTINATION: sample@local, FORMAT: ENCRYPTED PDF, FUNCTION: MIXED DOCUMENTS, BLANK PAPER SKIP, ····· | 0095.config |
| 0093 | 2020/02/11 20:24 | FAX | TRANSMISSION DESTINATION: 0123456789, SAMPLE (CO., LTD.), TRANSMISSION SIZE: A3, DOCUMENT: DOUBLE-SIDED→SINGLE-SIDED, FUNCTION: TIME-SPECIFIED, ····· | 0093.config |
| 0092 | 2020/02/11 20:20 | COPY | TRAY: TRAY 3, DOCUMENT: DOUBLE-SIDED→DOUBLE-SIDED, DENSITY: TEXT+PHOTOGRAPHIC PAPER PHOTO, ····· | 0092.config |
| 0091 | 2020/02/11 17:10 | Scan to SMB | TRANSMISSION DESTINATION: ¥¥USERFOLDER¥test, FORMAT: bmp, ····· | 0091.config |
| 0090 | 2020/02/11 13:20 | FAX | TRANSMISSION DESTINATION: 0987654321, TRANSMISSION SIZE: A4, DOCUMENT: SINGLE-SIDED→SINGLE-SIDED, ····· | 0090.config |

FIG. 11A

SETTING HISTORY

JOB ID "0100"

2020/02/22 20:35 COPY
TRAY: TRAY 1, DOCUMENT: SINGLE-SIDED→DOUBLE-SIDED,
DENSITY: PHOTOGRAPHIC PAPER PHOTO, ·····
2020/02/22 20:20 COPY
TRAY: TRAY 1, DOCUMENT: SINGLE-SIDED→DOUBLE-SIDED,
DENSITY: TEXT, ·····
2020/02/22 19:19 Scan to E-mail TRANSMISSION DESTINATION:
sample@local, test@test.ne.jp, FORMAT: HIGHLY COMPRESSED PDF,
RESOLUTION: 600x600dpi, FUNCTION: BLANK PAPER, ·····
2020/02/22 18:18 FAX TRANSMISSION DESTINATION:0123456789,
SAMPLE (CO., LTD.), TRANSMISSION SIZE: A3, DOCUMENT: DOUBLE-
SIDED→SINGLE-SIDED, FUNCTION: TIME-SPECIFIED, ·····
2020/02/22 18:10 Scan to SMB
TRANSMISSION DESTINATION: ¥¥USERFOLDER¥test,
FORMAT: jpeg, FUNCTION: MIXED DOCUMENTS, ·····

FIG. 11B

SETTING HISTORY

2020/02/12 09:01 Scan to E-mail TRANSMISSION
DESTINATION: sample@local, FORMAT: ENCRYPTED PDF,
FUNCTION: MIXED DOCUMENTS, BLANK PAPER SKIP·····
2020/02/11 20:24 FAX TRANSMISSION DESTINATION:0123456789,
SAMPLE (CO., LTD.), TRANSMISSION SIZE: A3, DOCUMENT: DOUBLE-
SIDED→SINGLE-SIDED, FUNCTION: TIME-SPECIFIED, ·····
2020/02/11 20:20 COPY
TRAY: TRAY 3, DOCUMENT: DOUBLE-SIDED→DOUBLE-SIDED,
DENSITY: TEXT+PHOTOGRAPHIC PAPER PHOTO, ·····
2020/02/11 17:10 Scan to SMB TRANSMISSION DESTINATION:
¥¥USERFOLDER¥test,
FORMAT: bmp, ·····
2020/02/11 13:20 FAX TRANSMISSION DESTINATION:
0987654321, TRANSMISSION SIZE: A4, DOCUMENT: SINGLE-
SIDED→SINGLE-SIDED, ·····

FIG. 12

| | PROCESSING OF STEP S810 | PROCESSING OF STEP S820 |
|---|---|---|
| (1) | COMPUTE FREQUENCY OF USE OF SETTING HISTORY INFORMATION | DETERMINE SETTING HISTORY INFORMATION IN WHICH FREQUENCY OF USE IS SMALLEST |
| (2) | COMPUTE NUMBER OF ITEMS OF SETTING VALUE CHANGED FROM INITIAL VALUE | DETERMINE SETTING HISTORY INFORMATION IN WHICH NUMBER OF ITEMS OF CHANGED SETTING VALUE IS SMALLEST |
| (3) | COMPUTE FREQUENCY OF USE OF SETTING HISTORY INFORMATION FOR EACH JOB TYPE | DETERMINE SETTING HISTORY INFORMATION OF JOB TYPE IN WHICH FREQUENCY OF USE IS SMALLEST |
| (4) | DETERMINE SETTING HISTORY INFORMATION IN WHICH ONLY SPECIFIC VALUE IS CHANGED | |
| (5) | DETERMINE SETTING HISTORY INFORMATION PERTAINING TO JOB EXECUTED FROM JOB PROGRAM | |
| (6) | DETERMINE SETTING HISTORY INFORMATION PERTAINING TO IMAGE TRANSMISSION JOB OF TRANSMITTING IMAGE TO DESTINATION SELECTED FROM REGISTERED ADDRESS BOOK | |
| (7) | DETERMINE SETTING HISTORY INFORMATION PERTAINING TO IMAGE TRANSMISSION JOB IN WHICH DESTINATION IN ADDRESS BOOK IS MODIFIED OR DELETED | |
| (8) | DETERMINE SETTING HISTORY INFORMATION WHOSE EXECUTION IS INHIBITED OR SUPPRESSED IN OTHER SETTINGS | |

HISTORY INFORMATION MANAGEMENT DEVICE, IMAGE PROCESSING DEVICE, AND HISTORY INFORMATION MANAGEMENT METHOD

BACKGROUND OF THE INVENTION

Field of the Invention

The present disclosure relates to a history information management device, and the like.

Description of the Background Art

Some image processing devices such as multifunction machines are related to execution of a job such as printing, faxing, or image transmission, and store, as setting history information, setting values related to execution of these jobs.

In recent years, attempts have been made to reduce the user's time and effort involved in execution of a job by using stored setting history information. Specifically, an image processing device lists, on a displayer, setting history information in such a way that user's selection is enabled. The image processing device that accepts user's selection of setting history information can easily reproduce a job associated with the setting history information by executing the job, based on a setting value associated with the setting history information.

However, there is a limit to the number of pieces of setting history information storable by an image processing device. Usually, an image processing device stores latest setting history information in the order of job execution. When the number of pieces of stored setting history information reaches the storable limit number, the image processing device secures a storage capacity for storing the latest setting history information by deleting the stored setting history information.

Deletion of setting history information is not necessarily performed for setting history information whose utility value is not so high to a user, specifically, for which the user does not feel inconvenience even when the setting history information is deleted. In some cases, setting history information whose utility value is high to the user may be deleted unintentionally. Therefore, it is necessary for the user to check and manage setting history information that is determined not to be kept as a history, and setting history information that is necessary to be kept as a history.

In view of the circumstances as described above, for example, a conventional technology discloses an image processing device that prevents a history of a job that the user wants to see from being hidden, in a case where a history of a job is displayed.

Although a conventional technology describes deleting, from an integrated history database, a setting history having the oldest execution date and time, in a case where there is no vacancy in an integrated history data table, no conventional technology considers whether history information to be deleted is information that is necessary to be kept as a history.

An object of the present disclosure is to provide a history information management device and the like that can store and manage setting history information useful to a user.

SUMMARY OF THE INVENTION

In order to solve the above problem, a history information management device according to the present disclosure includes: a storage capable of storing a predetermined limit number of pieces of setting history information pertaining to execution of a job; and a controller that controls execution of the job by using the setting history information. In a case where the number of pieces of the stored setting history information has reached the predetermined limit number, the controller deletes, from the storage, the setting history information according to a result of use of the setting history information.

Further, an image processing device according to the present disclosure includes: the above-described history information management device; and an image processor that performs image processing based on the job.

Further, a history information management method according to the present disclosure includes: storing a predetermined limit number of pieces of setting history information pertaining to execution of a job; controlling execution of the job by using the setting history information; and, in a case where the number of pieces of the stored setting history information has reached the predetermined limit number, deleting, from a storage, the setting history information according to a result of use of the setting history information.

According to the present disclosure, it is possible to provide a history information management device and the like that can store and manage setting history information useful to a user.

BRIEF DESCRIPTION OF THE DRAWINGS

FIG. 3 is a diagram illustrating a data structure of setting history information.

FIG. 4 is a diagram illustrating a data structure of job history information.

FIG. 7 is a diagram illustrating a data structure of a frequency of use management table.

FIGS. 8A and 8B are diagrams illustrating a data structure of setting history information.

FIGS. 11A and 11B are diagrams illustrating an operation example according to the first embodiment.

FIG. 12 is a diagram illustrating an operation example according to the first embodiment.

DESCRIPTION OF THE PREFERRED EMBODIMENTS

In the following, embodiments according to the present disclosure are described with reference to the drawings. In the present disclosure, description is made based on a premise that a multifunction machine capable of executing a job pertaining to, for example, copying, faxing, image transmission, or the like by means of one housing is an embodiment of a history information management device or an image processing device incorporated with the history information management device. Note that, the following embodiments are an example for describing the present disclosure, and the technical scope of the description described in the claims is not limited to the following description.

1. First Embodiment

1.1 Functional Configuration

Figure 1:
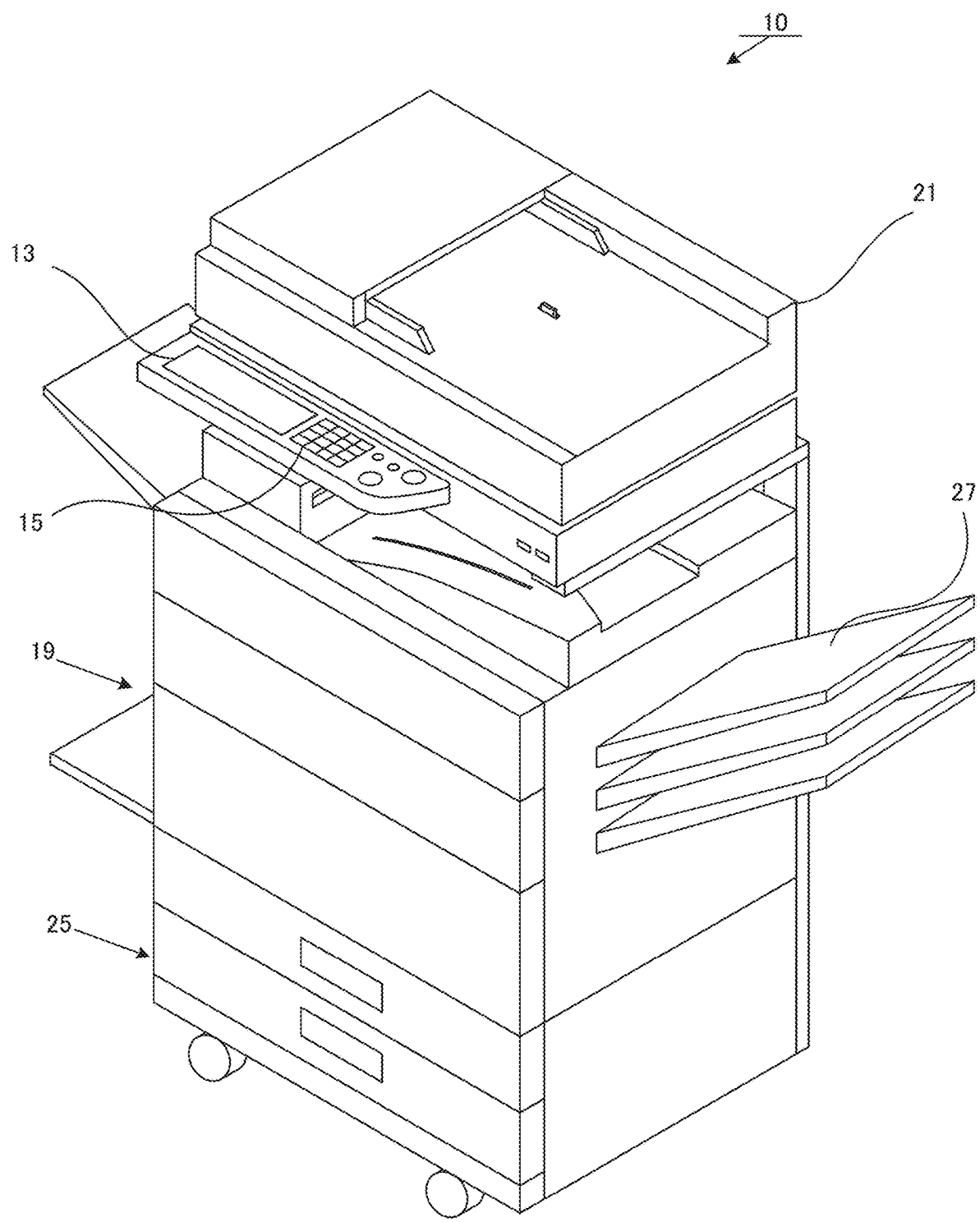
FIG. 1 is a diagram illustrating an overall configuration of a multifunction machine according to a first embodiment.
Figure 2:
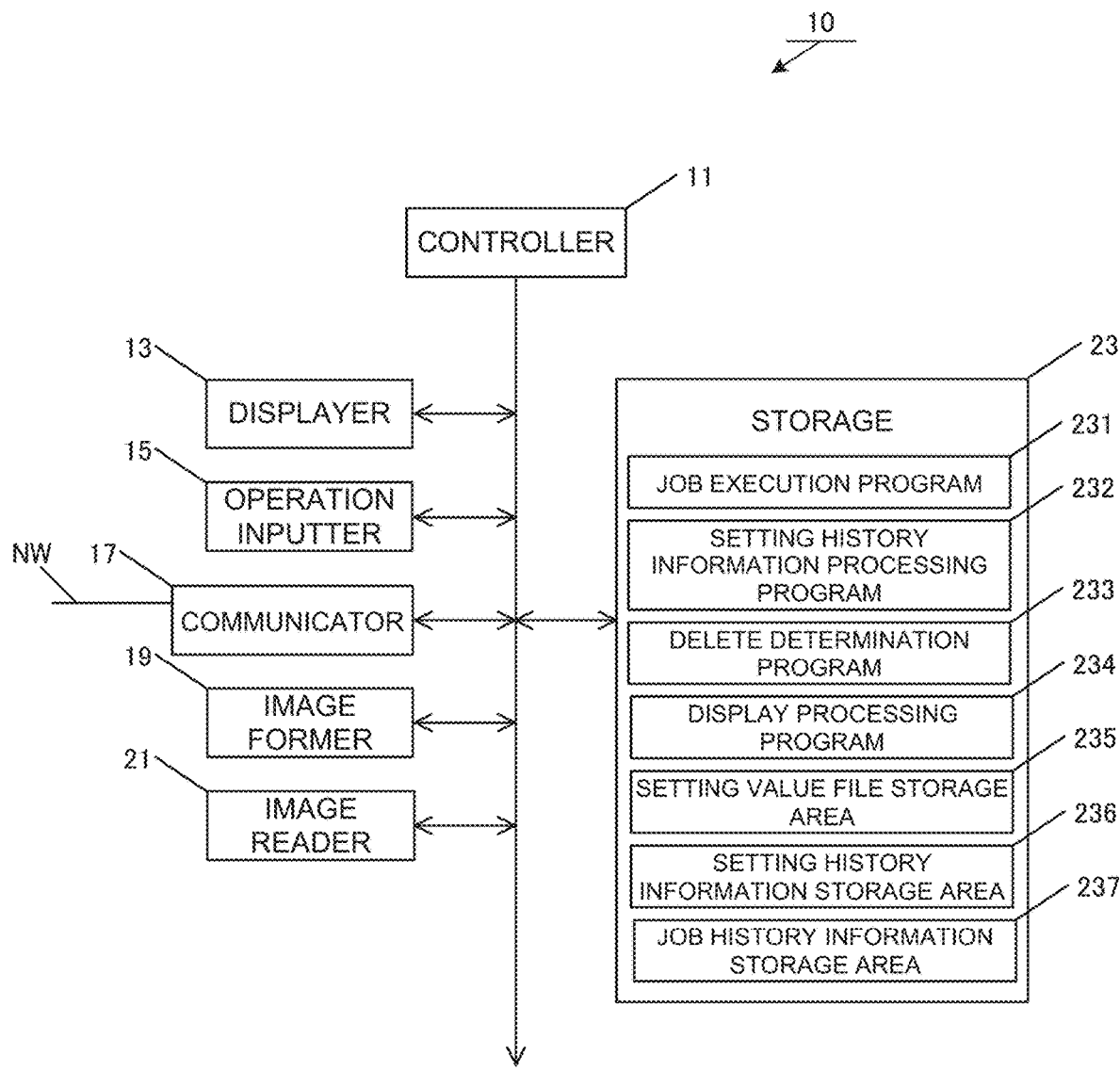
FIG. 2 is a functional configuration diagram of the multifunction machine according to the first embodiment.

A functional configuration of a multifunction machine 10 according to a first embodiment is described with reference to FIGS. 1 and 2. FIG. 1 is an external perspective view schematically illustrating an overall configuration of the multifunction machine 10. FIG. 2 is a functional configuration diagram of the multifunction machine 10. The multifunction machine 10 includes a controller 11, a displayer 13, an operation inputter 15, a communicator 17, an image former 19 and an image reader 21 as an image processor, and a storage 23.

The controller 11 controls the entirety of the multifunction machine 10. The controller 11 is configured of, for example, one or more arithmetic devices (such as a central processing unit (CPU)). The controller 11 achieves its function by reading and executing various programs stored in the storage 23.

The displayer 13 displays various pieces of information to a user or others. The displayer 13 can be configured of, for example, a liquid crystal display (LCD), an organic electroluminescence (EL) display, or the like.

The operation inputter 15 accepts an input of information by a user or others. The operation inputter 15 can be configured of hard keys (e.g., a numeric keypad), buttons, and the like. Note that, the operation inputter 15 can be configured as a touch panel that allows an input via the displayer 13. In this case, as an input method of a touch panel, for example, a general method such as a resistive film method, an infrared method, an electromagnetic induction method, and an electrostatic capacitance method can be employed.

The communicator 17 includes either one or both of wired and wireless interfaces for performing communication with another device via a network (NW) such as, for example, a local area network (LAN), a wide area network (WAN), the Internet, a telephone line, or a fax line.

The image former 19 forms an image based on image data on paper as a recording medium. The image former 19 feeds paper from a paper feeder 25, forms an image based on image data on the paper, and then discharges the paper to a paper discharger 27. The image former 19 can be configured of, for example, a laser printer or the like using an electrophotographic method. In this case, the image former 19 performs image formation by using toner supplied from unillustrated toner cartridges associated with toner colors (e.g., cyan (C), magenta (M), yellow (Y), and black (K)).

The image reader 21 generates image data by scanning and reading a document image to be read. The image reader 21 can be configured, for example, as a scanner device including an image sensor such as a charge coupled device (CCD), and a contact image sensor (CIS). There is no restriction on a configuration of the image reader 21, as long as the image reader 21 is configured to generate image data by reading a reflected light image from a document image with use of an image sensor.

The storage 23 stores various programs necessary for an operation of the multifunction machine 10, and various pieces of data. The storage 23 can be configured of a storage device such as, for example, a random access memory (RAM), a hard disk drive (HDD), a solid state drive (SSD), and a read only memory (ROM).

In the first embodiment, the storage 23 stores a job execution program 231, a setting history information processing program 232, a delete determination program 233, and a display processing program 234, and secures a setting value file storage area 235, a setting history information storage area 236, and a job history information storage area 237.

The job execution program 231 is a program to be read by the controller 11 to perform processing accompanied by execution of each function such as copying, faxing, and image transmission in a unit of a job. The controller 11 that has read the job execution program 231 executes a job by controlling the displayer 13, the operation inputter 15, the communicator 17, the image former 19, the image reader 21, and the like. In addition, the controller 11 that has read the job execution program 231 can execute various jobs, based on a setting value included in a setting value file of setting history information.

The setting history information processing program 232 is, for example, a program to be read by the controller 11 when acquiring a setting value and the like pertaining to job execution, generating setting history information, and performing various pieces of processing with respect to setting history information. The controller 11 that has read the setting history information processing program 232 acquires a setting value pertaining to execution of a job, and generates a setting value file including the setting value. Then, the controller 11 stores the generated setting value file in the setting value file storage area 235. Further, the controller 11 generates setting history information by associating the setting value file with identification information (e.g., a job ID) for identifying to which job, the setting value file is related. Then, the controller 11 stores, in the setting history information storage area 236, the generated setting history information, as a setting history.

The delete determination program 233 is a program to be read by the controller 11 when the number of pieces of stored setting history information in the setting history information storage area 236 has reached a predetermined limit number. The controller 11 that has read the delete determination program 233 deletes, from the setting history information storage area 236, setting history information determined according to a result of use of setting history information. The result of use of setting history information is described later.

The display processing program 234 is a program to be read by the controller 11 when displaying, on the displayer 13, a display screen that lists setting history information, as a setting history, a setting screen for accepting an input of various setting values pertaining to execution of a job, a basic screen (home screen) that displays the setting screen in a switchable manner, a login screen for user authentication, or the like.

The setting value file storage area 235 is a storage area that stores a generated setting value file by the controller 11 that has read the setting history information processing program 232. Setting values include, for example, setting values set by a user, such as a color mode, a resolution, a format, and a density, and setting values such as a device default value held by the device itself. The controller 11 that has read the job execution program 231 reads, from the setting value file storage area 235, a setting value file associated with setting history information to be executed, and executes the setting value file.

The setting history information storage area 236 is a storage area that stores generated setting history information by the controller 11 that has read the setting history information processing program 232. Setting history information stored in the setting history information storage area 236 is read, as necessary, when display processing as a setting history, or a job based on the setting history information is executed. Note that, the setting history information storage area 236 can store a predetermined limit number of pieces of setting history information. Herein, there is no particular restriction on the predetermined storable limit number. In the following description, for the sake of easy description, description is made based on a premise that the predetermined limit number storable in the setting history information storage area 236 all at once is "10", but there is no particular restriction on the predetermined storable limit number. The predetermined limit number storable in the setting history information storage area 236 may be set by taking into consideration a physical storage capacity of the storage 23, or a displayable area on the displayer 13.

Herein, setting history information according to the present disclosure is described. FIG. 3 is a diagram illustrating a configuration example of a data structure of setting history information stored in the setting history information storage area 236.

Setting history information in the example illustrated in FIG. 3 includes a job ID, an execution date and time, a job type, a display setting value, and a setting value file name.

The job ID is identification information for identifying to which job, setting history information is related. The execution date and time indicates a date and a time when a job is executed. The job type indicates a type of an executed job (e.g., copy, scan to e-mail, and the like). The display setting value indicates a part of a setting value (content) to be displayed on a setting history information display screen to be described later. The setting value file name is a file name of a setting value file associated with the setting history information.

For example, setting history information pertaining to the job ID "0099" indicates setting history information related to the job type "copy", which was executed at "2020/02/22 20:20". Further, the job is a copy job executed based on setting values included in the setting value file name "0099.config", and is an example in which setting values (items) such as "tray:tray 1; document: single-sided-→double-sided; density: text, . . . " are set as display setting values to be displayed on a setting history information display screen. Note that, display setting values set for each job ID are merely an example, and setting values to be displayed on a setting history information display screen are not limited to those illustrated in FIG. 3.

Referring back to FIG. 2, the job history information storage area 237 is a storage area that stores an execution record of a job, as job history information. Herein, job history information according to the present disclosure is described. FIG. 4 is a diagram illustrating a configuration example of a data structure of job history information stored in the job history information storage area 237.

The job history information illustrated in the example in FIG. 4 includes a job ID, an execution date and time, a job type, a user name, and a status.

The job ID, the execution date and time, and the job type are the same items as the items included in the setting history information illustrated in FIG. 3. The user name indicates a name of a user who has executed the job. The status indicates a processing status of the job.

For example, job history information pertaining to the job ID "0098" indicates job history information related to the job type "scan to e-mail", which was executed at "2020/02/22 19:19". Further, the job indicates that an execution instruction is input by the user name "aaaaa", and the status of the job is "finished".

Unlike setting history information, the job history information is information that records an execution history of a job. The job history information can be generated at any timing such as after registration of a job, after completion of a job, or after generation of setting history information. Note that, since setting history information according to the present disclosure is deleted according to a result of use, a discrepancy may occur in history information to be displayed between a job history based on job history information, and a setting history based on setting history information.

1.2. Flow of Processing

Figure 5:
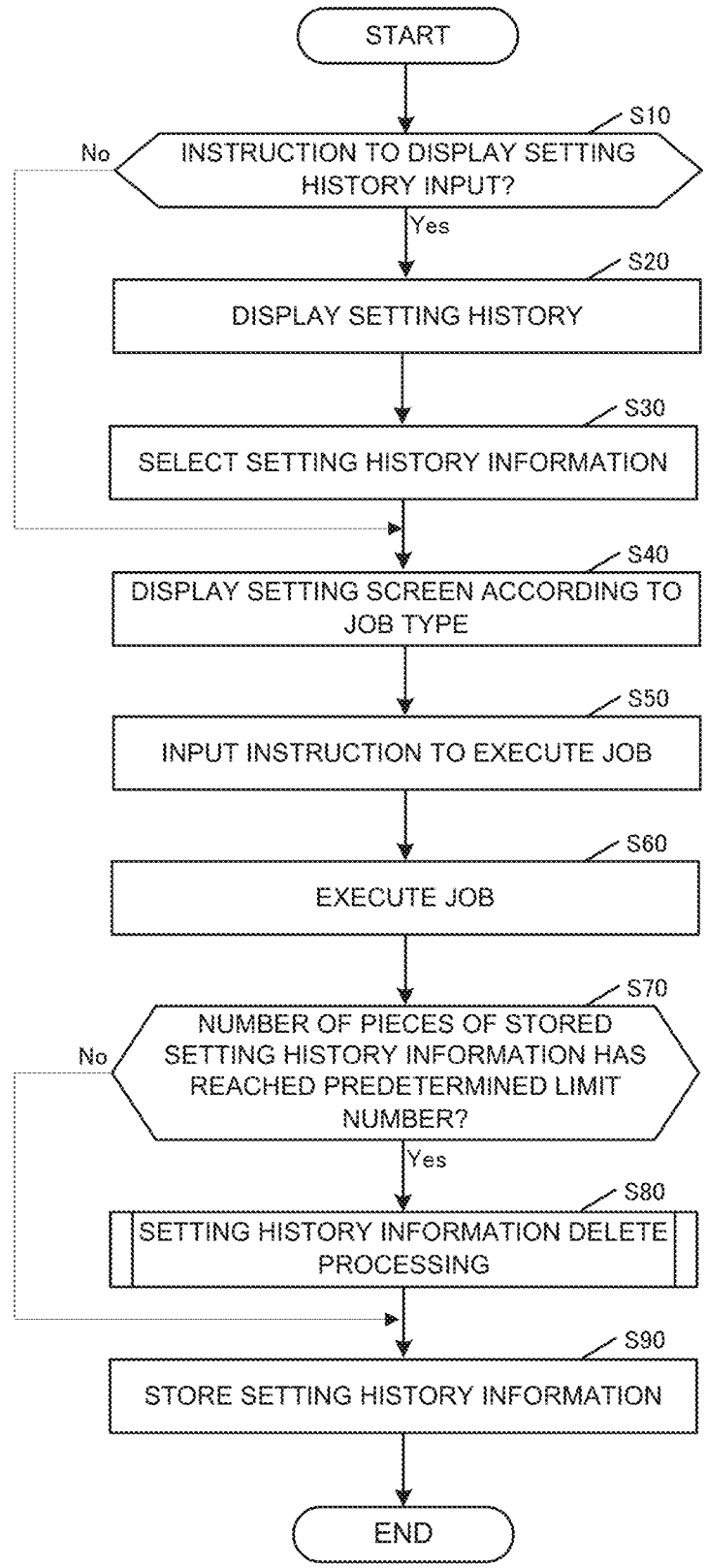
FIG. 5 is a flowchart illustrating a flow of processing according to the first embodiment.

Next, a flow of processing according to the first embodiment is described. FIG. 5 is a flowchart illustrating processing pertaining to storing setting history information by the multifunction machine 10. Processing described herein is processing to be performed by causing the controller 11 to read the display processing program 234, the job execution program 231, the setting history information processing program 232, and the delete determination program 233.

First, the controller 11 determines whether an instruction to display a setting history has been input by the user (step S10). The instruction to display a setting history can be accepted, for example, via a unillustrated home screen or a setting screen according to each job type.

In a case where it is determined that an instruction to display a setting history has been input, the controller 11 displays, as a setting history, setting history information stored in the setting history information storage area 236 (step S10; Yes→step S20). On the other hand, in a case where it is determined that an instruction to display a setting history has not been input, the controller 11 proceeds the processing to step S40 (step S10; No→step S40).

Subsequently, the controller 11 accepts user's selection of setting history information (step S30).

When the controller 11 accepts the selection of setting history information, the controller 11 reads a setting value file associated with the setting history information, and displays a setting screen according to a job type (step S40). By the way, in a case where an instruction to display a setting history has not been input by the user, the controller 11 displays a setting screen according to a job type selected by the user.

When the controller 11 accepts an input of an instruction to execute a job via the setting screen, the controller 11 executes the job (step S50→step S60).

When the controller 11 executes the job, the controller 11 determines whether the number of pieces of stored setting history information has reached a predetermined limit number (step S70).

When the number of pieces of stored setting history information has reached the predetermined limit number, the controller 11 executes setting history information delete processing (step S70; Yes→step S80). On the other hand, in a case where the number of pieces of stored setting history information has not reached the predetermined limit number, the controller 11 proceeds the processing to step S90 (step S70; No→step S90).

The controller 11 stores, in the setting history information storage area 236, new setting history information pertaining to the job executed in step S60, and terminates the processing (step S90).

Since it is conceived that a user executes the same job again regarding a job that has been intentionally cancelled by the user due to a jam, a trouble code, or the like, the setting history information is handled as unnecessary setting history information, and is not stored.

Figure 6:
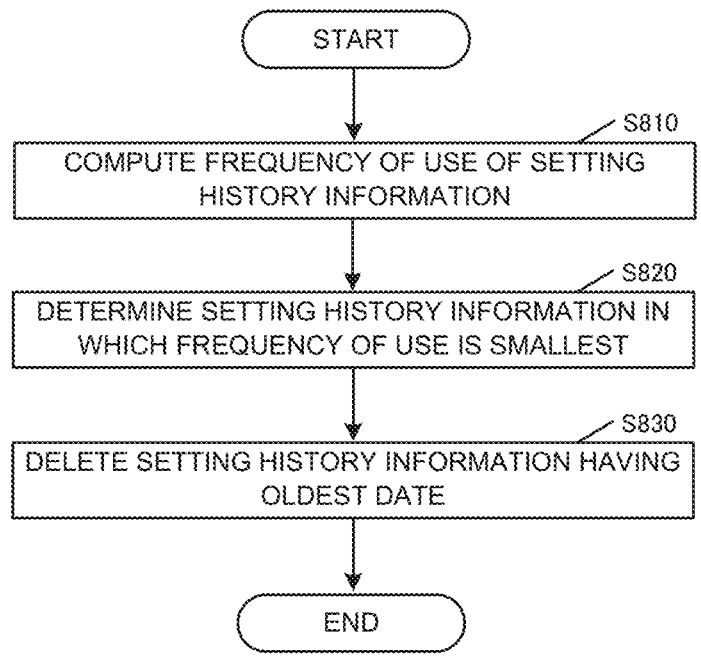
FIG. 6 is a flowchart illustrating a flow of processing according to the first embodiment.

Subsequently, setting history information delete processing pertaining to step S80 in FIG. 5 is described by using the flowchart in FIG. 6. The processing described herein is processing to be executed by causing the controller 11 to read the delete determination program 233. Note that, in FIG. 6, as a method of determining setting history information to be deleted, a determination method based on a frequency of use (reference frequency of use) of the setting history information is described as a result of use of setting history information.

The controller 11 computes a frequency of use of the setting history information, as a result of use of setting history information (step S810).

Then, the controller 11 determines setting history information in which the frequency of use is smallest (step S820).

The controller 11 deletes, from the determined setting history information in which the frequency of use is smallest, setting history information having the oldest date, as oldest setting history information in the order of storage, and terminates the processing (step S830).

FIG. 7 is a configuration example of a data structure of a frequency of use management table in which setting history information pertaining to each job ID illustrated in FIG. 3, and a computation result on a frequency of use of the setting history information are associated.

The job ID at the left end in the table indicates each job ID illustrated in FIG. 3. The frequency of use in the middle of the table indicates the frequency of use of setting history information computed by the controller 11. The deletion determination flag at the right end in the table is a flag to be attached to setting history information (to be deleted) having the oldest date among the determined setting history information in which the frequency of use is smallest. The controller 11 deletes setting history information to which a deletion determination flag is attached.

FIG. 7 is an example, in which the frequency of use of pieces of setting history information pertaining to the job IDs "0099", "0097" and "0094" is computed to be "0 time". Among these pieces of setting history information, setting history information pertaining to the job ID "0094", which is setting history information of a job having the oldest date, is determined as setting history information to be deleted (see FIG. 3).

As illustrated in FIG. 8A, when the setting history information pertaining to the job ID"0094" is deleted, setting history information pertaining to the latest job can be stored.

FIG. 8B illustrates a manner in which setting history information pertaining to the job ID "0100", which is generated by execution of a new copy job, is stored in a storage area generated by deletion of the job ID "0094".

1.3. Operation Example

Figure 9A:
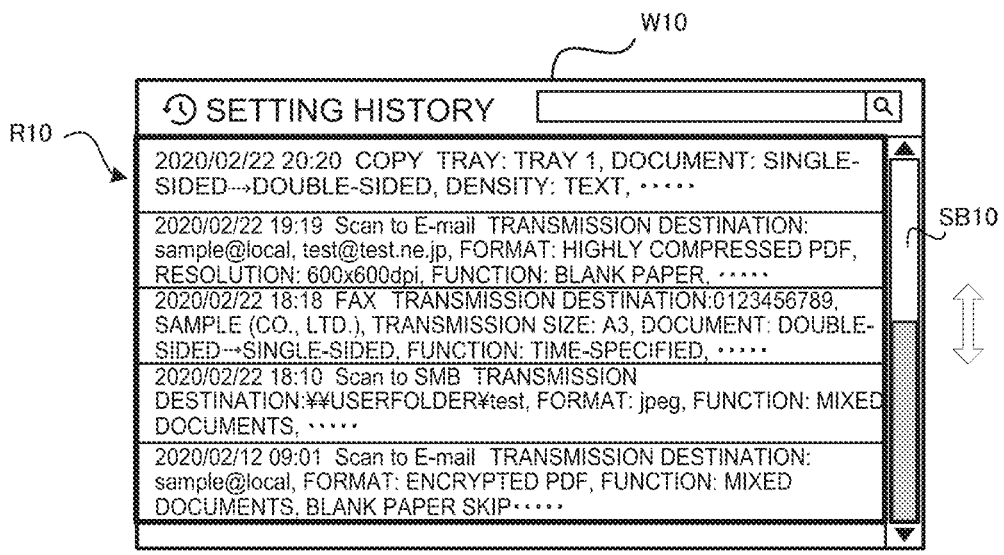
FIGS. 9A and 9B are diagrams illustrating an operation example according to the first embodiment.
Figure 9B:
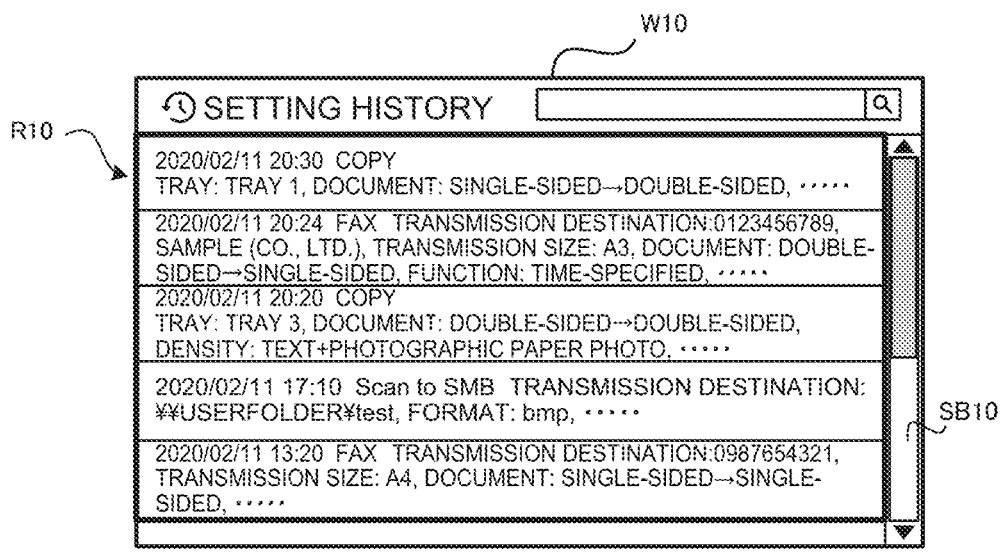

Next, an operation example according to the first embodiment is described. FIGS. 9A and 9B are a configuration example of a setting history display screen that displays setting history information as a setting history. Note that, the present operation example is equivalent to processing of step S10 and step S20 in FIG. 5.

FIG. 9A is an example in which pieces of setting history information from the job ID "0099" to the job ID "0095" illustrated in FIG. 3 are listed as a setting history on a setting history display screen W10. Note that, the setting history display screen W10 can be displayed, for example, via a home screen W20 illustrated in FIG. 10A, or a setting screen W30 according to each job type illustrated in FIG. 10B.

The setting history display screen W10 includes a setting history information display area R10, and a slider bar SB10. The setting history information display area R10 is a display area that selectably displays setting history information pertaining to each job ID. The slider bar SB10 is configured to be slidable up and down. The slider bar SB10 accepts an instruction to display a hidden area in the setting history information display area R10. For example, a hidden area can be displayed in the setting history information display area R10 by performing an operation of moving the slider bar SB10 up and down, pressing an arrow button, or flicking the setting history information display area R10.

For example, FIG. 9B is an example in which a hidden area is displayed in FIG. 9A by operating the slider bar SB10. Specifically, FIG. 9B is an example in which pieces of setting history information pertaining from the job ID "0094" to the job ID "0090" in FIG. 3 are listed as a setting history on the setting history display screen W10.

Figure 10A:
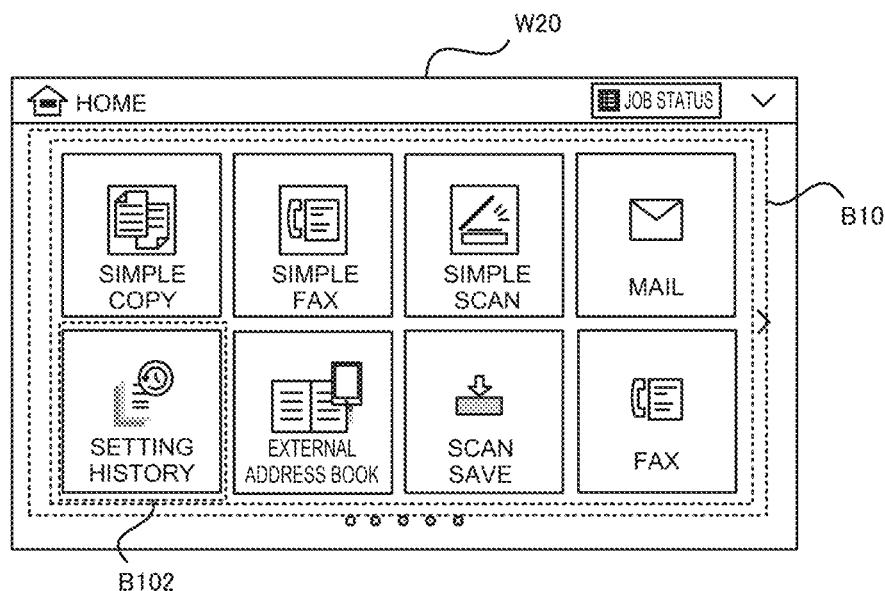
FIGS. 10A and 10B are diagrams illustrating an operation example according to the first embodiment.

Herein, the home screen W20 and the setting screen W30 that accept an instruction to display the setting history display screen W10 are described. FIG. 10A is a configuration example of the home screen W20. The home screen W20 is a basic screen that is displayed on the displayer 13, for example, when the power is turned on, in a standby mode, when the device is restored from a sleep mode, or the like, and accepts an operation input by the user. The home screen W20 includes a mode selection button B10.

The mode selection button B10 is a button that accepts selection of an operation mode of the multifunction machine 10. FIG. 10A is a configuration example in which, as a selectable operation mode, a "simple copy" button, a "simple fax" button, a "simple scan" button, a "mail" button, a "fax" button, a "scan save" button, an "external address book" button, and a "setting history" button B102 are provided. Note that, the button configuration example illustrated in FIG. 10A is an example, and can be changed as necessary via, for example, an unillustrated system configuration screen or the like.

The user can display, on the displayer 13, the setting history display screen W10 illustrated in FIG. 9A or FIG. 9B, for example, by pressing the "setting history" button B102 of the mode selection button B10.

Figure 10B:
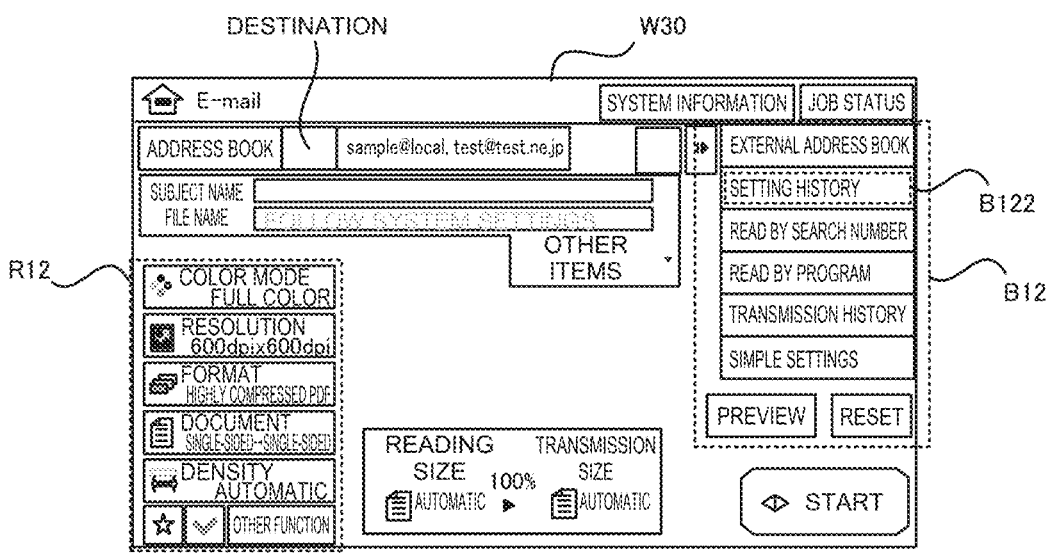

On the other hand, FIG. 10B is a configuration example of the setting screen W30 pertaining to an image transmission job. The setting screen W30 can be displayed by pressing the "mail" button included in the mode selection button B10 on the home screen W20.

The setting screen W30 includes a setting value display area R12, and a processing selection button B12, in addition to an address book button, a subject name input box, and the like.

The setting value display area R12 is a display area that displays a setting value pertaining to image transmission. The setting value display area R12 displays a device default value pertaining to image transmission, or a setting value based on a setting value file read by the controller 11.

The processing selection button B12 is a button that accepts selection of processing (action) desired by the user. The processing selection button B12 includes, a "setting history" button B122, in addition to selection buttons that accept various pieces of processing such as an "external address book", "reading by a search number", "reading by a program", a "transmission history", and "simple settings". The user can display, on the displayer 13, the setting history display screen W10 illustrated in FIG. 9A or FIG. 9B, for example, by pressing the "setting history" button B122 of the processing selection button B12.

By the way, the setting screen W30 can also be displayed by selecting setting history information listed on the setting history display screen W10, in addition to pressing the mode selection button B10 via the home screen W20. Note that, FIG. 10B is also a configuration example of the setting screen W30 to be displayed on the displayer 13, in a case where setting history information pertaining to "scan to e-mail" of the job ID "0098" is selected in the setting history information display area R10 in FIG. 9A. In this case, the setting value display area R12 on the setting screen W30 reflects and displays a setting value of a setting value file associated with the setting history information of the job ID "0098".

FIG. 11 is a configuration example of the setting history display screen W10 when setting history information in a storage status illustrated in FIG. 8B is displayed as a setting history. Note that, FIGS. 11A and 11B are diagrams illustrating states before and after an operation of the slider bar SB10 is performed, as well as FIGS. 9A and 9B.

As described in FIG. 8B and the like, setting history information pertaining to the job ID "0094" is hidden in the setting history information display area R10, accompanied by deletion of the job ID "0094" (FIG. 11B).

On the other hand, setting history information pertaining to the job ID "0100", which is generated by execution of a new copy job, is displayed at a top position in a setting history, as latest setting history information (FIG. 11A).

Determination of Setting History Information to be Deleted Step S80 in FIG. 5, and processing of step S80 are described. In processing of steps S810 and S820 in FIG. 6, setting history information to be deleted can also be determined, for example, by determination methods illustrated in FIG. 12.

A determination method (1) is a method of determining setting history information in which the frequency of use is smallest, as described above.

A determination method (2) is a method in which the number of items of a setting value changed from an initial value is computed in step S810, and setting history information in which the number of items of a changed setting value is smallest is determined in step S820. In a case where a change from an initial value is small, it can be determined that the frequency of use of the setting history information is low.

A determination method (3) is a method in which the frequency of use of setting history information is computed for each job type in step S810, and setting history information in which the frequency of use of a job (type) is smallest is determined in step S820. In a case where the frequency of use of a job (type) is small, it can be determined that the frequency of use of the setting history information is low.

A determination method (4) is a method of determining setting history information in which only a specific item to be changed, for example, the number of copies, has been changed for each use of setting history information in step S810. Even when setting history information is stored, it can be determined that it is highly likely that a setting content is changed, and necessity of keeping setting history information is low.

A determination method (5) is a method of determining setting history information pertaining to a job executed from a job program in step S810. Herein, a job program pertaining to the present disclosure is a technique for permanently and manually storing settings related to a job, and indicates batch settings in which settings related to job processing are registered in a batch manner. In a use case in which a fixed job is repeatedly executed, the number of setting steps when executing the job can be reduced because the user can set setting values pertaining to the job in a batch manner by invoking and executing the job program. Thus, since a setting value pertaining to a job executed from a job program is already registered as the job program, it can be determined that necessity of keeping setting history information is low.

A determination method (6) is a method of determining setting history information pertaining to an image transmission job in which a destination selected from a registered address book is a transmission destination in step S810. Since a destination is registered in an address book, and selection of the destination is easy, it can be determined that necessity of keeping setting history information pertaining to an image transmission job is low.

A determination method (7) is a method of determining setting history information pertaining to an image transmission job in which a destination in a registered address book is modified or deleted in step S810. Since the setting history information is not based on a destination in an address book at the time of initial registration, it can be determined that necessity of keeping setting history information is low.

A determination method (8) is a method of determining setting history information whose execution is inhibited or suppressed in other settings in step S810. Since job execution is disabled even when the setting history information is selected due to an influence on an optional setting (e.g., color printing prohibition setting or the like), it can be determined that necessity of keeping setting history information is low.

Application of the determination methods illustrated in FIG. 12 may be determined based on user's selection. In addition, when determining setting history information to be deleted, instead of selecting one of the determination methods (1) to (8), these determination methods may be combined by setting priorities, for example, the determination method (3)→the determination method (5)→the determination method (8).

As described above, according to the first embodiment, in a case where the number of pieces of stored setting history information has reached a predetermined limit number, setting history information is deleted from a storage according to a result of use of setting history information. Therefore, it is possible to provide a history information management device and the like that can store and manage setting history information useful to a user.

2. Second Embodiment

A second embodiment is an embodiment in which setting history information to be deleted is determined according to a user's authentication status or a login status with administrative privileges.

2.1 Functional Configuration

Figure 13:
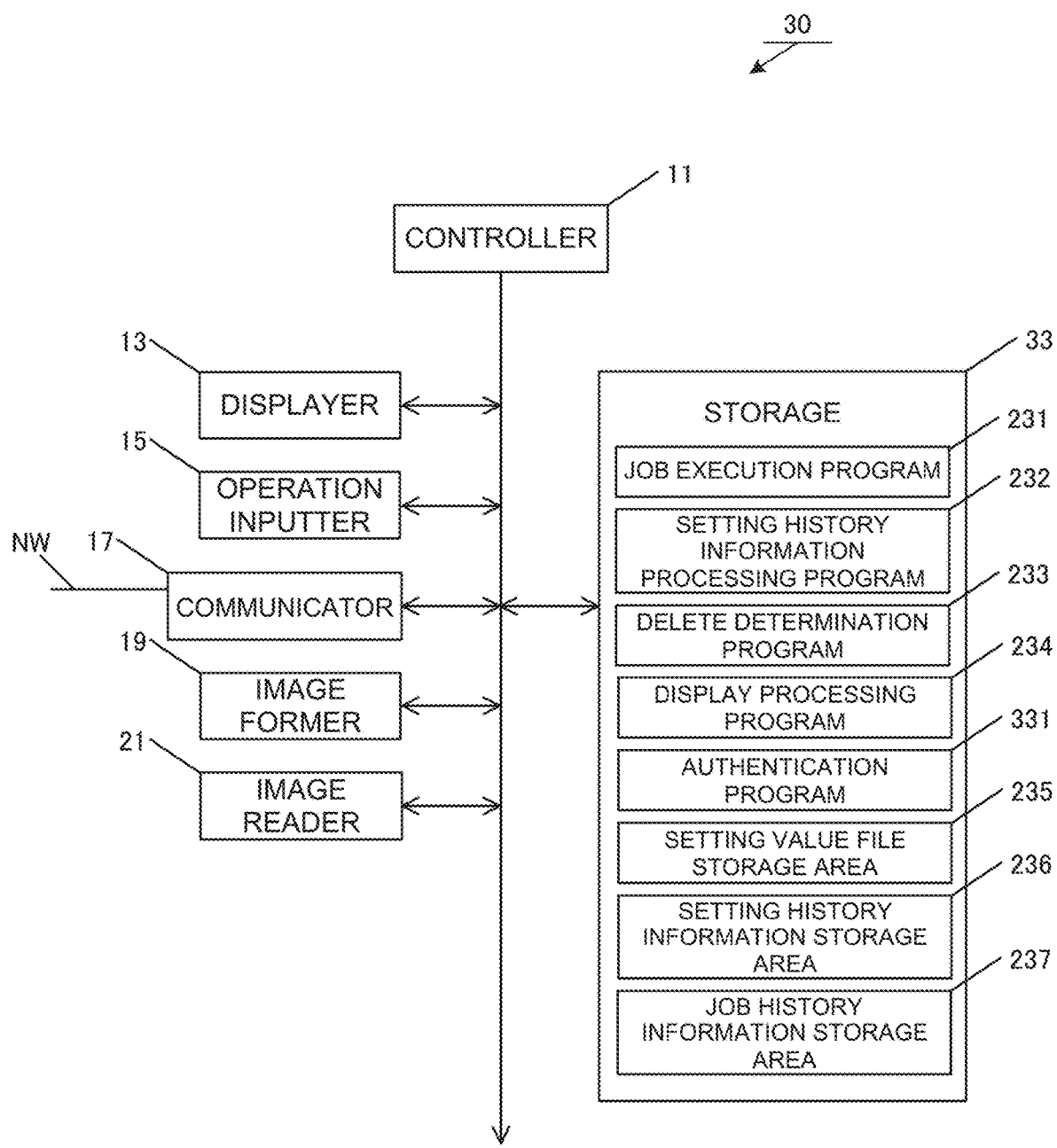
FIG. 13 is a functional configuration diagram of a multifunction machine according to a second embodiment.

FIG. 13 is a functional configuration diagram of a multifunction machine 30 according to the second embodiment. The multifunction machine 30 includes a storage 33 in place of the storage 23 of the multifunction machine 10 according to the first embodiment. Note that, in the following description, a same component as that of the multifunction machine 10 according to the first embodiment is indicated with a same reference sign, and description thereof may be omitted.

In addition to a configuration of the storage 23, the storage 33 stores an authentication program 331. The authentication program 331 is a program to be read by a controller 11 at the time of user authentication.

The controller 11 accepts an input of authentication information pertaining to user authentication, such as, for example, a login user name, and a login password, and performs user authentication. Note that, in a case where a login operation is performed with administrative privileges, the controller 11 authenticates the administrative user by requesting an input of administrator information, or referring to registration information as an administrative user, as necessary.

The controller 11 can perform user authentication by collating a combination of a login user name and a login password input by the user with a combination of a login user name and a login password registered in advance in the machine. Note that, user authentication may be performed by an authentication server installed separately on the outside. In this case, a login user name and a login password for user authentication are stored in the authentication server.

By the way, in addition to a combination of a login user name and a login password, user authentication can also be performed by, for example, a combination of an identification number, a registration number, or the like, and a login password; belongings authentication using a token, a key, an integrated circuit (IC) card, a smart phone, and the like; or biometric authentication such as fingerprint authentication and face recognition.

2.2 Flow of Processing

2.2.1 Processing when User Authentication is Enabled

Figure 14:
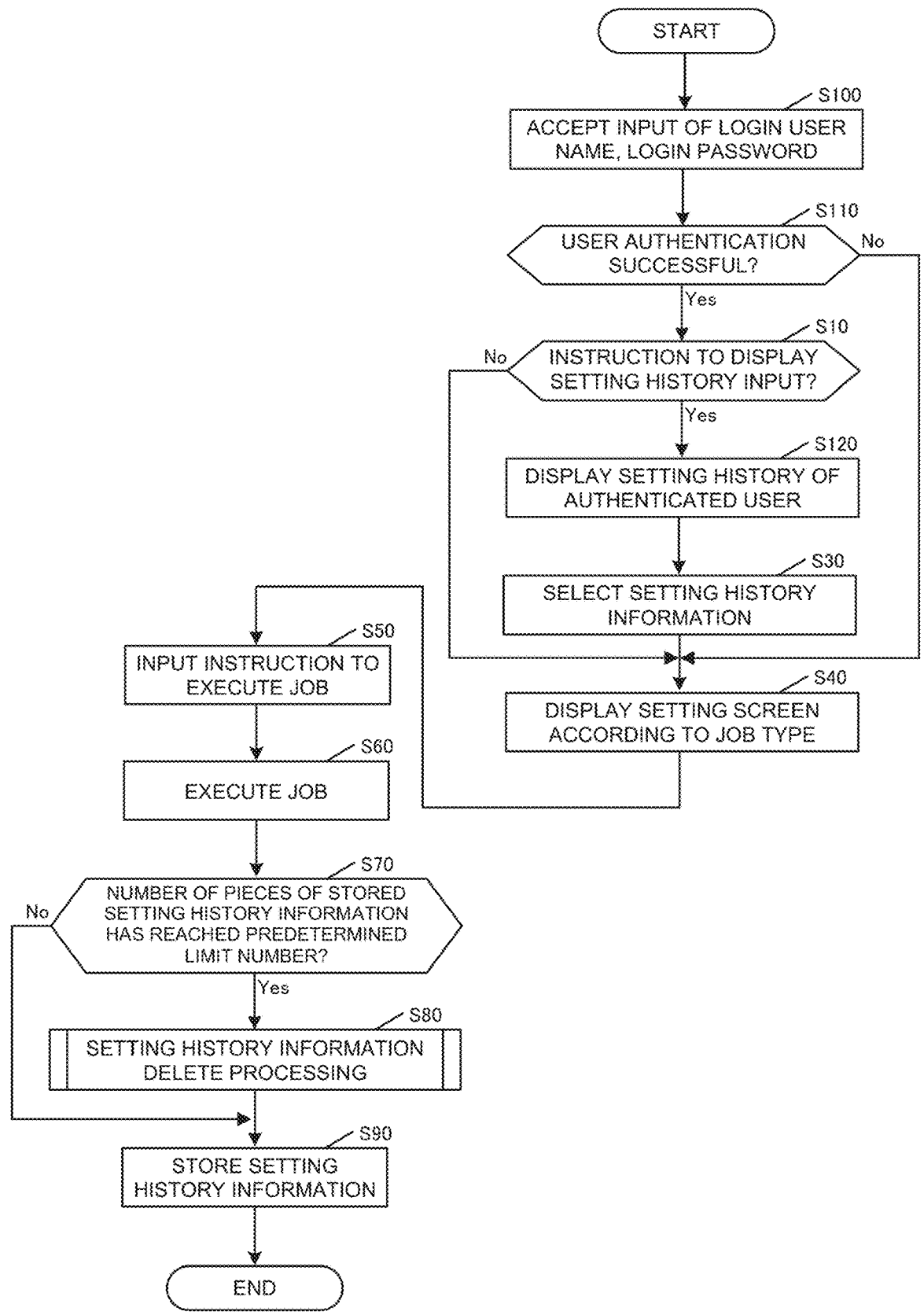
FIG. 14 is a flowchart illustrating a flow of processing according to the second embodiment.

First, a flow of processing when user authentication is enabled is described by using the flowchart in FIG. 14. Note that, the same processing as the processing described in the flowchart in FIG. 5 according to the first embodiment is indicated with the same step number. Processing described herein is processing to be performed by causing the controller 11 to read the authentication program 331, the display processing program 234, the job execution program 231, the setting history information processing program 232, and the delete determination program 233.

First, the controller 11 accepts an input of authentication information such as a login user name, a login password, and the like by the user via an authentication screen (step S100).

The controller 11 performs user authentication, based on the input login user name and the input login password, and determines whether user authentication is successful (step S110).

In a case where user authentication is successful, the controller 11 determines whether an instruction to display a setting history has been input by the user (step S110; Yes→step S10). On the other hand, in a case where user authentication has failed, the controller 11 proceeds the processing to step S40 (step S110; No→step S40).

In a case where it is determined that an instruction to display a setting history has been input, the controller 11 displays only setting history information pertaining to the user who is successfully authenticated (Step S10; Yes→step S120). On the other hand, in a case where it is determined that an instruction to display a setting history has not been input, the controller 11 proceeds the processing to step S40 (step S10; No→step S40).

The controller 11 accepts user's selection of setting history information (step S30).

When the controller 11 accepts the selection of setting history information, the controller 11 reads a setting value file associated with the setting history information, and displays a setting screen according to a job type (step S40). By the way, in a case where user authentication has failed (step S110; No), or in a case where an instruction to display a setting history has not been input by the user (step S10; No), the controller 11 displays a setting screen according to a job type selected by the user (step S40).

When the controller 11 accepts an input of an instruction to execute a job via the setting screen, the controller 11 executes the job (step S50→step S60).

When the controller 11 executes the job, the controller 11 determines whether the number of pieces of stored setting history information has reached a predetermined limit number (step S70).

When the number of pieces of stored setting history information has reached the predetermined limit number, the controller 11 performs setting history information delete processing (step S70; Yes→step S80). On the other hand, in a case where the number of pieces of stored setting history information has not reached the predetermined limit number, the controller 11 proceeds the processing to step S90 (step S70; No→step S90).

The controller 11 stores, in the setting history information storage area 236, new setting history information pertaining to the job executed in step S60, and terminates the processing (step S90).

2.2.2 Processing Involving Login Operation with Administrative Privileges

Figure 15:
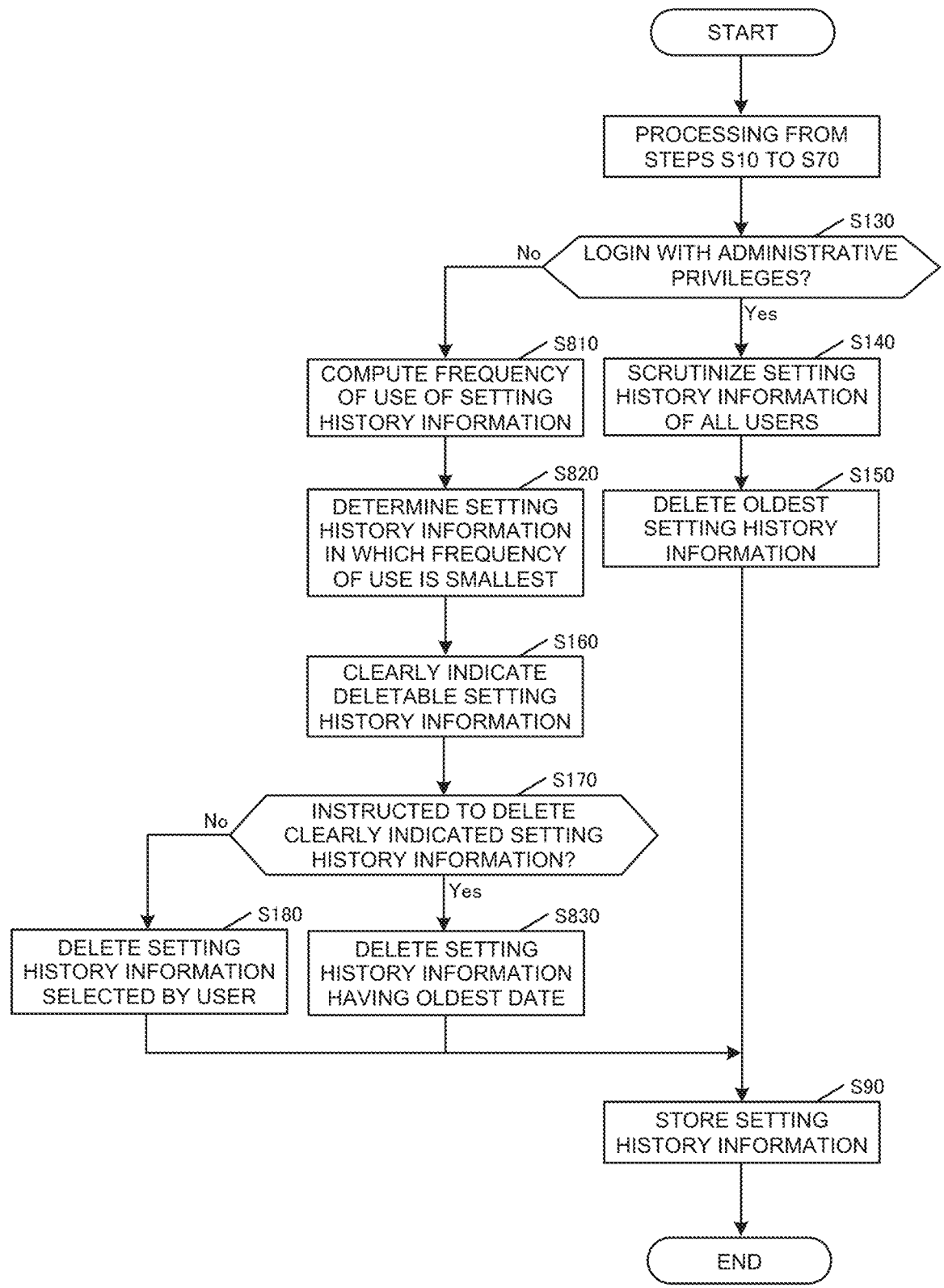
FIG. 15 is a flowchart illustrating a flow of processing according to the second embodiment.

Next, processing in a case where a login operation with administrative privileges is involved is described by using the flowchart in FIG. 15.

First, when processing from step S100 (step S10) to step S70 according to the flowchart in FIG. 5 or FIG. 14 is performed, the controller 11 determines whether the processing from step S100 (step S10) to step S70 is performed by an administrative user who logs in with administrative privileges (step S130).

In a case where processing from step S100 (step S10) to step S70 is performed by an administrative user who logs in with administrative privileges, the controller 11 scrutinizes setting history information pertaining to all users using the multifunction machine 30 (step S130; Yes→step S140). Subsequently, the controller 11 determines the oldest setting history information among setting history information pertaining to all users, and deletes the oldest setting history information (step S150).

Then, the controller 11 stores, in the setting history information storage area 236, new setting history information pertaining to the job executed in step S60, and terminates the processing (step S90).

Note that, in a case where processing from step S100 (step S10) to step S70 is not performed by an administrative user who logs in with administrative privileges, the controller 11 performs processing pertaining to step S810 in setting history information delete processing (step S130; No→step S810).

For example, in a case where determination of setting history information to be deleted is "determination of setting history information in which the frequency of use is smallest" by the determination method (1), the controller 11 computes the frequency of use of setting history information, as a result of use of setting history information (step S810).

Then, the controller 11 determines setting history information in which the frequency of use is smallest (step S820). Note that, processing pertaining to determination of setting history information in step S810 and step S820 can be performed by either one of the determination method (1) through the determination method (8) described above, or a combination of these determination methods.

Next, the controller 11 dearly indicates, to the user, the determined setting history information, as deletable setting history information (step S160).

The controller 11 determines whether an instruction to delete the clearly indicated setting history information has been input (step S170).

When the controller 11 determines that an instruction to delete the dearly indicated setting history information has been input, the controller 11 deletes, from the determined setting history information in which the frequency of use is smallest, setting history information having the oldest date (step S170; Yes→step S830).

On the other hand, in a case where it is determined that an instruction to delete the dearly indicated setting history information has not been input, the controller 11 deletes the setting history information selected by the user (step S170; No→step S180).

Then, the controller 11 stores, in the setting history information storage area 236, new setting history information pertaining to the job executed in step S60, and terminates the processing (step S90).

In this way, more efficient setting history information management can be performed by providing an administrative user with privileges to delete setting history information of all users, as administrative privileges. In addition, for example, in a case where a plurality of users hold the same type of setting history information, it is possible to improve efficiency of a storage area, and increase the overall number of pieces of stored setting history information by referring to the same storage destination, based on administrative privileges, in place of individual management.

2.3. Operation Example

Figure 16:
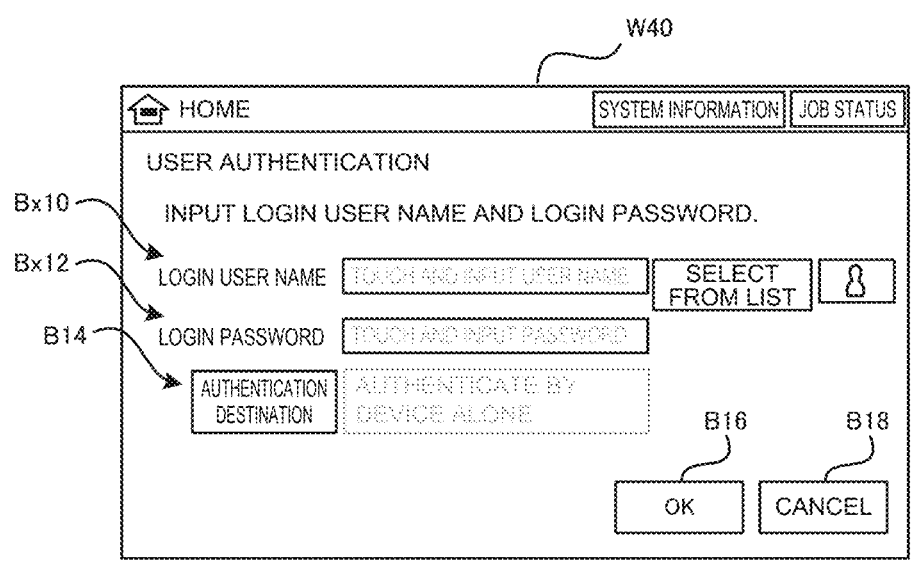
FIG. 16 is a diagram illustrating an operation example according to the second embodiment.

Next, an operation example according to the second embodiment is described. FIG. 16 is a diagram illustrating a configuration example of an authentication screen W40 that accepts an input of authentication information such as a login user name and a login password. The user can log in the multifunction machine 30 as a login user by performing user authentication via the authentication screen W40.

The authentication screen W40 includes a login user name input box Bx10, a login password input box Bx12, an authentication destination designation button B14, an OK button B16, and a cancel button B18.

The login user name input box Bx10 is an input box that accepts an input of a login user name. A user trying to log in the multifunction machine 30, or an administrative user trying to log in with administrative privileges inputs a login name in the login user name input box Bx10. Note that, the login name can also be selected from an unillustrated user name list to be displayed by pressing a "select from a list" button disposed next to the input box.

The login password input box Bx12 is an input box that accepts an input of a login password associated with the login user name. A user or other person trying to log in the multifunction machine 30 inputs a login password together with an input of a login user name.

The authentication destination designation button B14 is a button that accepts designation of an authentication destination of a user. The authentication destination may be a device itself, or it may be possible to designate, for example, an authentication server or the like established separately on a network. In a case where authentication by a device itself is selected as an authentication destination, the controller 11 performs user authentication by comparing an input login user name and an input login password with authentication information (for example, combination of a user name and a password) prepared in advance. On the other hand, in a case where an authentication server or the like established on a network is used, the controller 11 can also perform user authentication by transmitting an input login user name and an input login password to the authentication server, and receiving an authentication result from the authentication server.

The OK button B16 accepts an instruction to confirm an input operation by the user. The user presses the OK button B16, in a case where an input to the login user name input box Bx10 and the login password input box Bx12, and designation of an authentication destination via the authentication destination designation button B14 are confirmed. The cancel button B18 is a button that accepts an input of an instruction to cancel an input operation by the user.

Figure 17A:
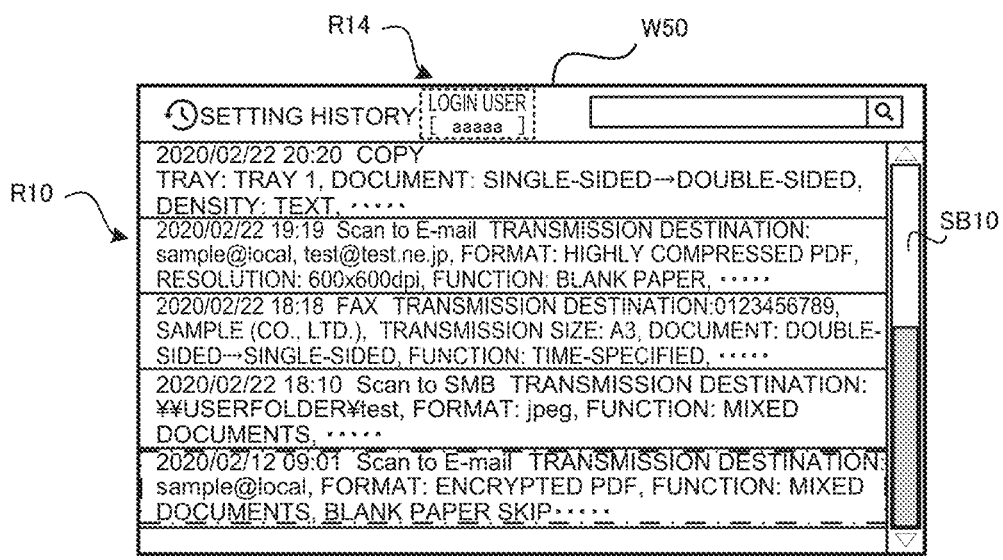
FIGS. 17A and 17B are diagrams illustrating an operation example according to the second embodiment.

FIG. 17A is a configuration example of a setting history display screen W50 according to the second embodiment. Note that, an operation example illustrated in FIG. 17A is equivalent to processing pertaining to step S120 in FIG. 14. The setting history display screen W50 includes a login user name display area R14, in addition to a configuration of the setting history display screen W10 according to the first embodiment.

In the setting history information display area R10 on the setting history display screen W50, only the setting history information pertaining to the login user who is successfully authenticated in step S110 in FIG. 14 is displayed. For example, in a case where pieces of setting history information pertaining to the job IDs "0099" to "0095" illustrated in FIG. 3 are performed by the login user "aaaaa", the pieces of setting history information pertaining to the job IDs "0099" to "0095" are displayed in the setting history information display area R10. Also, since the login user name is displayed in the login user name display area R14, the user (login user) who refers to the setting history display screen W50 can easily recognize whose (his/her) execution job, the setting history information pertains to.

Figure 17B:
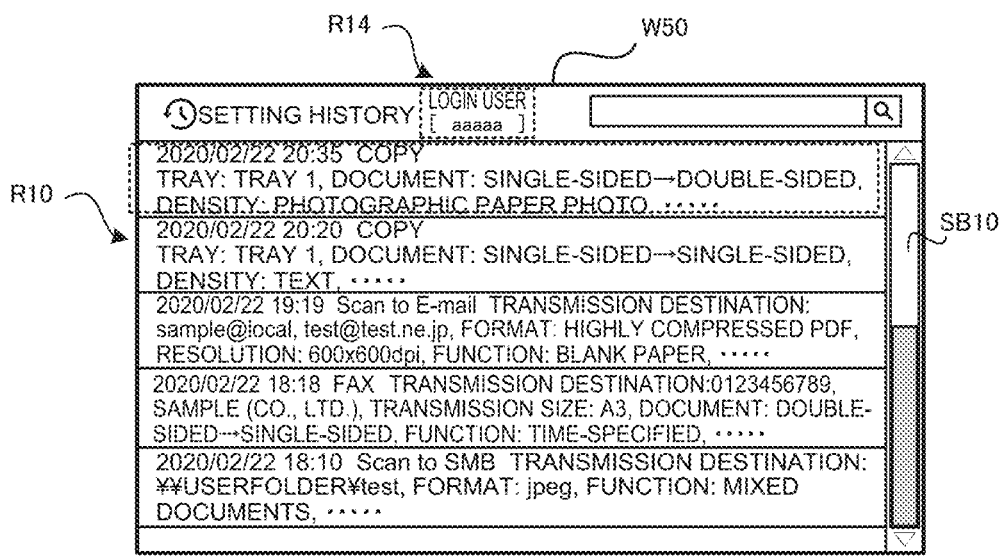

FIG. 17B is an example of a screen display in a case where setting history information pertaining to the job ID "0095", which is indicated by the single-dotted chain line frame in FIG. 17A, is determined as setting history information to be deleted among setting history information illustrated in FIG. 17A. Note that, the present operation example is equivalent to the processing from step S60 to step S90 in FIG. 14.

As illustrated in FIG. 17B, setting history information pertaining to the job ID "0095", which is determined as setting history information to be deleted, is no longer displayed in the setting history information display area R10, and setting history information pertaining to the job ID "0100", which is generated by a new copy job, is displayed at a top position in a setting history, as latest setting history information.

As described above, according to the second embodiment, in addition to the advantageous effect according to the first embodiment, a login user who is successfully authenticated can set only the setting history information pertaining to his/her execution job, as an operation target. This prevents the login user from operating setting history information pertaining to an execution job of other users. Therefore, it is possible to prevent in advance an accident such as inadvertently deleting setting history information of other users. Furthermore, according to the second embodiment, since there is no risk of leakage of, for example, destination information pertaining to an image transmission job to other users, security can also be improved.

3. Third Embodiment

In the first embodiment, computation processing for determining setting history information to be deleted is performed when the number of pieces of stored setting history information has reached a predetermined limit number. In a third embodiment, efficiency of setting history information delete processing is improved by performing computation processing on the frequency of use of setting history information after job execution.

A functional configuration of a multifunction machine according to the third embodiment can be made substantially the same as that of the multifunction machine 10 according to the first embodiment. In a case of the third embodiment, a controller 11 that has read a setting history information processing program 232 performs computation processing for determining setting history information to be deleted.

Figure 18:
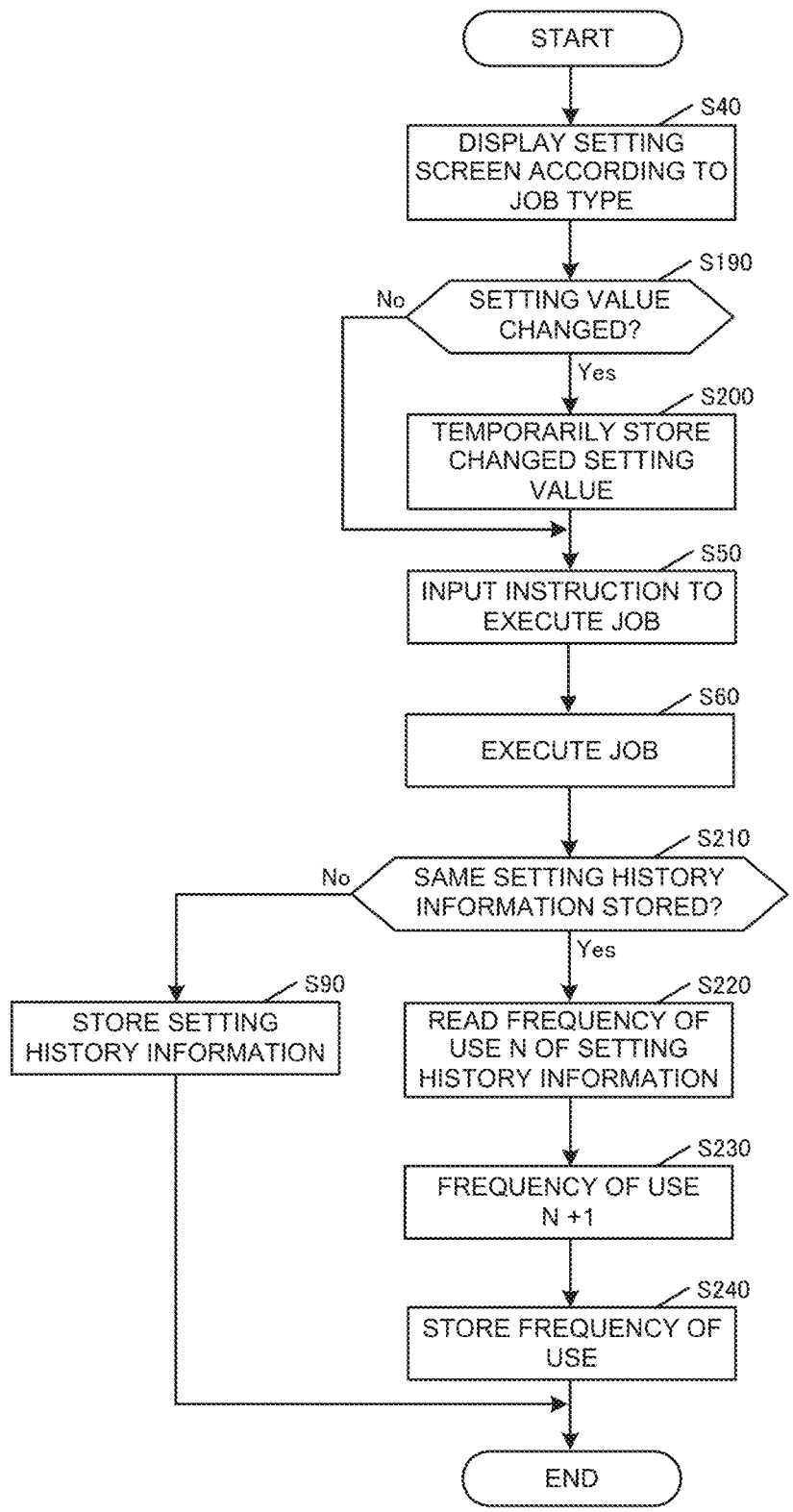
FIG. 18 is a flowchart illustrating a flow of processing according to a third embodiment.

FIG. 18 is a flowchart illustrating computation processing on the frequency of use of setting history information according to the third embodiment. In description regarding FIG. 18, description is made based on a premise that processing from step S10 to step S30 in FIG. 5 is performed. In addition, a part to which the same processing as the processing illustrated in FIG. 5 can be applied is indicated with the same step number.

A controller 11 displays a setting screen according to a job type (step S40). Subsequently, the controller 11 determines whether a setting value has been changed by the user via the displayed setting screen (step S190).

In a case where it is determined that a setting value has been changed by the user, the controller 11 temporarily stores the changed setting value (step S190; Yes→step S200). In a case where it is determined that a setting value has not been changed by the user, the controller 11 proceeds the processing to step S50 (step S190; No→step S50).

When the controller 11 accepts an input of an instruction to execute a job via the setting screen, the controller 11 executes the job (step S50→step S60).

The controller 11 refers to setting history information stored in a setting history information storage area 236, and determines whether setting history information having the same job type and the same setting value file content as those of the setting history information pertaining to execution of the job is stored (step S210).

When it is determined that setting history information having the same content is stored, the controller 11 reads the frequency of use N of the setting history information serving as a result of use (step S210; Yes→step S220). Note that, the frequency of use N may be included in a setting value file, as a part of a setting value item, or, as illustrated in FIG. 7, the frequency of use N may be managed as a frequency of use management table in which the frequency of use of setting history information is associated with a job ID of setting history information.

The controller 11 updates and stores the frequency of use N by adding "1" to the frequency of use N read in step S220 (step S230→step S240). In this case, it is not necessary to store, in the setting history information storage area 236, setting history information itself pertaining to execution of the job, as new setting history information. In this case, there is no likelihood that a storage capacity of the setting history information storage area 236 may be reduced by deleting a changed setting value that is temporarily stored in step S200.

On the other hand, when it is determined that setting history information having the same content is not stored, the controller 11 stores, in the setting history information storage area 236, the setting history information, as new setting history information (step S210; No→step S90), and terminates the processing.

As described above, in the third embodiment, since pre-processing for determining setting history information to be deleted is performed before the number of pieces of stored setting history information reaches a predetermined limit number, efficiency of setting history information delete processing can be achieved.

By the way, in the third embodiment, in order to improve efficiency of setting history information delete processing, the determination method (1) is described as a determination method of setting history information to be deleted. However, the third embodiment can also be applied to any of the determination methods (2) through (8) illustrated in FIG. 12. Specifically, it is possible to achieve efficiency of setting history information delete processing by performing processing associated with step S210 to step S240 in FIG. 18 with respect to any of the determination methods (2) to (8), before the number of pieces of stored setting history information reaches a predetermined limit number (e.g., immediately after a job is executed).

The present disclosure is not limited to the above-described embodiments, and various changes are available. Specifically, embodiments to be acquired by appropriately combining modified technical means within a range that does not depart from the gist of the present disclosure are also included in the technical scope of the present disclosure.

Although some of the foregoing embodiments are described separately for convenience of explanation, it is needless to say that such embodiments may be combined and implemented within a technically allowable range.

In addition, a program operating in each device in the embodiments is a program (a program causing a computer to function) that controls a CPU or the like in such a way as to achieve functions of the above-described embodiments.

Further, information to be handled by these devices is temporarily stored in a temporary storage device (e.g., a RAM) at the time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

What is claimed is:

1. A history information management device comprising:
a storage capable of storing a predetermined limit number of pieces of setting history information pertaining to execution of a job; and
a controller that controls the execution of the job by using the stored setting history information, wherein
in a case that a number of pieces of the stored setting history information has reached the predetermined limit number, the controller deletes, from the storage, setting history information in which a number of items changed from an initial value is smallest among the stored setting history information as a result of use of the setting history information.

2. The history information management device according to claim 1, wherein
when deleting the setting history information from the storage, the controller deletes oldest setting history information, in an order of storage, among the stored setting history information.

3. The history information management device according to claim 1, wherein
the controller further deletes, as the result of the use of the setting history information, setting history information in which a frequency of use is smallest among the stored setting history information.

4. The history information management device according to claim 1, wherein
the controller further deletes, as the result of the use of the setting history information, setting history information pertaining to the job in which a frequency of use is smallest among the stored setting history information.

5. The history information management device according to claim 1, wherein
the controller further deletes, as the result of the use of the setting history information, setting history information, among the stored setting history information, that pertains to the job in which only a specific item to be changed has been changed for each use of the setting history information.

6. The history information management device according to claim 1, wherein
the controller further deletes, as the result of the use of the setting history information, setting history information, among the stored setting history information, that pertains to the job that has been executed from batch settings in which settings related to processing of the job are registered in a batch manner.

7. The history information management device according to claim 1, wherein
the controller further deletes, as the result of the use of the setting history information, setting history information, among the stored setting history information, in which execution of the job pertaining to the setting history information is disabled.

8. The history information management device according to claim 1, wherein
the job includes an image transmission job in which a destination selected from a registered address book is a transmission destination, and
the controller further deletes, as the result of the use of the setting history information, setting history information, among the stored setting history information, that pertains to the image transmission job in which the destination selected from the registered address book is a transmission destination.

9. The history information management device according to claim 8, wherein
the controller further deletes, as the result of the use of the setting history information, setting history information, among the stored setting history information, in which a destination of the image transmission job is modified or deleted.

10. The history information management device according to claim 1, further comprising:
a displayer that displays the stored setting history information, wherein
the controller further controls the displayer to display only setting history information pertaining to a user when a user authentication is enabled.

11. An image processing device comprising:
the history information management device according to claim 1; and
an image processor that performs image processing based on the job.

12. A history information management method comprising:
storing a predetermined limit number of pieces of setting history information pertaining to execution of a job;
controlling the execution of the job by using the stored setting history information; and
in a case that a number of pieces of the stored setting history information has reached the predetermined limit number, deleting, from a storage, the setting history information in which a number of items changed from an initial value is smallest among the stored setting history information as a result of use of the setting history information.

13. A history information management device comprising:
a storage capable of storing a predetermined limit number of pieces of setting history information pertaining to execution of a job; and
a controller that controls the execution of the job by using the stored setting history information, wherein
in a case that a number of pieces of the stored setting history information has reached the predetermined limit number, the controller deletes, as a result of use of the setting history information, setting history information, among the stored setting history information, that pertains to the job in which only a specific item to be changed has been changed for each use of the setting history information.

\* \* \* \* \*